US011466912B2

(12) United States Patent
Bradshaw et al.

(10) Patent No.: US 11,466,912 B2
(45) Date of Patent: Oct. 11, 2022

(54) ACTIVATION AND DEACTIVATION OF A PURGE UNIT OF A VAPOR COMPRESSION SYSTEM BASED AT LEAST IN PART ON CONDITIONS WITHIN A CONDENSER OF THE VAPOR COMPRESSION SYSTEM

(71) Applicant: Johnson Controls Technology Company, Auburn Hills, MI (US)

(72) Inventors: David Andrew Bradshaw, Timonium, MD (US); Andrew Michael Welch, Mount Wolf, PA (US); Curtis C. Crane, York, PA (US); Calvin Andrew Nelson, York, PA (US)

(73) Assignee: Johnson Controls TYCO IP Holdings LLP, Milwaukee, WI (US)

( * ) Notice: Subject to any disclaimer, the term of this patent is extended or adjusted under 35 U.S.C. 154(b) by 128 days.

(21) Appl. No.: 16/652,587

(22) PCT Filed: Oct. 4, 2018

(86) PCT No.: PCT/US2018/054441
§ 371 (c)(1),
(2) Date: Mar. 31, 2020

(87) PCT Pub. No.: WO2019/074765
PCT Pub. Date: Apr. 18, 2019

(65) Prior Publication Data

US 2020/0240690 A1 Jul. 30, 2020

Related U.S. Application Data

(60) Provisional application No. 62/610,778, filed on Dec. 27, 2017, provisional application No. 62/570,449, filed on Oct. 10, 2017.

(51) Int. Cl.
*F25B 49/02* (2006.01)
*F25B 39/04* (2006.01)
*F25B 43/04* (2006.01)

(52) U.S. Cl.
CPC .............. *F25B 49/02* (2013.01); *F25B 39/04* (2013.01); *F25B 43/043* (2013.01);
(Continued)

(58) Field of Classification Search
CPC ............ F25B 2339/047; F25B 2400/13; F25B 2700/195; F25B 2700/21163; F25B 39/04; F25B 43/043; F25B 49/02
See application file for complete search history.

(56) References Cited

U.S. PATENT DOCUMENTS 2,324,627 A 7/1943 Jones
3,230,729 A 1/1966 Eber
(Continued)

FOREIGN PATENT DOCUMENTS

CN 1314564 A 9/2001
CN 201382736 Y 1/2010
(Continued)

OTHER PUBLICATIONS

Japanese Office Action for JP Application No. 2020-519973, dated Jul. 2, 2021, 6 pgs.

(Continued)

*Primary Examiner* — Henry T Crenshaw
(74) *Attorney, Agent, or Firm* — Fletcher Yoder P.C.

(57) ABSTRACT

Embodiments of the present disclosure are directed toward purge units of vapor compression systems, and methods of control thereof, that selectively activate and deactivate the purge unit in response to one or more conditions to, for example, control refrigerant-to-air ratios while still minimizing the durations of the purge cycles. For example, in
(Continued)

certain embodiments, these conditions may include conditions within the chiller condenser, time since last purge activation, time since last venting of non-condensables, and combinations thereof. By reducing an amount of time that the purge unit would be active without removing a substantial amount non-condensables from the vapor compression system, present embodiments reduce the power consumption of the purge unit, as well as the vapor compression system as a whole, while still being responsive to prevent or mitigate a loss of efficiency due to a substantial accumulation of non-condensables in the condenser of the vapor compression system.

20 Claims, 12 Drawing Sheets

(52) U.S. Cl.
CPC ..... *F25B 2339/047* (2013.01); *F25B 2400/13* (2013.01); *F25B 2700/195* (2013.01); *F25B 2700/21163* (2013.01)

(56) References Cited

U.S. PATENT DOCUMENTS

| | | | | |
|---|---|---|---|---|
| 4,252,186 | A * | 2/1981 | Starner | F28B 1/02 165/161 |
| 5,031,410 | A | 7/1991 | Plzak et al. | |
| 5,592,826 | A | 1/1997 | Sagar et al. | |
| 6,260,378 | B1 * | 7/2001 | Sagar | F25B 43/043 62/149 |
| 6,442,963 | B1 | 9/2002 | Pfefferle et al. | |
| 8,359,873 | B2 | 1/2013 | Lifson et al. | |
| 9,140,475 | B2 | 9/2015 | Schrader et al. | |
| 2002/0020175 | A1 * | 2/2002 | Street | G05D 23/1917 62/132 |
| 2003/0074909 | A1 * | 4/2003 | Heiden | F25B 43/043 62/195 |
| 2013/0283830 | A1 * | 10/2013 | Jandal | B01D 53/007 29/890.035 |
| 2016/0033184 | A1 | 2/2016 | Fountain et al. | |
| 2016/0054040 | A1 | 2/2016 | Jonsson et al. | |
| 2016/0175740 | A1 | 6/2016 | Stark et al. | |
| 2017/0029679 | A1 | 2/2017 | Van Horn et al. | |
| 2017/0307269 | A1 * | 10/2017 | Gu | F25B 43/043 |

FOREIGN PATENT DOCUMENTS

| | | | |
|---|---|---|---|
| JP | 2006207928 | A | 8/2006 |
| JP | 2009109152 | A | 5/2009 |
| JP | 2009257762 | A | 11/2009 |
| WO | 2016069294 | A2 | 5/2016 |

OTHER PUBLICATIONS

International Search Report and Written Opinion for PCT Application No. PCT/US2018/054436, dated Dec. 17, 2018, 18 pgs.

International Search Report and Written Opinion for PCT Application No. PCT/US2018/054441, dated Dec. 19, 2018, 19 pgs.

International Search Report and Written Opinion for PCT Application No. PCT/US2018/054445, dated Dec. 12, 2018, 18 pgs.

International Search Report and Written Opinion for PCT Application No. PCT/US2018/054448, dated Dec. 19, 2018, 19 pgs.

"Installation, Operation, and Maintenance: CVHE, CVHF, and CVHG Water-Cooled CenTraVac Chillers with Tracer AdaptiView Control," Trane, Mar. 2015, 89 pgs.

"Installation, Operation, and Maintenance: EarthWise Purge System with Tracer AdaptiView Control for Water-Cooled CenTraVac Chillers with R-123 Refrigerant," Trane, Jul. 2017, 40 pgs.

"Product Catalog: EarthWise CenTraVac Water-Cooled Liquid Chillers 120-3950 Tons, 50 and 60 Hz," Trane, Apr. 2014, 103 pgs.

Trane, "Operation and Maintenance Guide: Earthwise Exhaust System with Tracer AdaptiView Control", Jan. 31, 2008, 9 pgs.

Chinese Office Action for CN Application No. 201880078279.1, dated Apr. 26, 2021, 12 pgs.

Japanese Office Action for JP Application No. 2020-519973, dated Mar. 3, 2021, 6 pgs.

Korean Office Action for KR Application No. 10-2020-7012919, dated Mar. 29, 2021, 7 pgs.

Korean Office Action for KR Application No. 10-2020-7012919, dated Oct. 19, 2021, 6 pgs.

Japanese Office Action for JP Application No. 2020-519973, dated Nov. 30, 2021, 4 pgs.

* cited by examiner

ACTIVATION AND DEACTIVATION OF A PURGE UNIT OF A VAPOR COMPRESSION SYSTEM BASED AT LEAST IN PART ON CONDITIONS WITHIN A CONDENSER OF THE VAPOR COMPRESSION SYSTEM

CROSS-REFERENCES TO RELATED APPLICATIONS

This application is a U.S. National Stage Application of PCT International Application No. PCT/US2018/054441, entitled "ACTIVATION AND DEACTIVATION OF A PURGE UNIT OF A VAPOR COMPRESSION SYSTEM BASED AT LEAST IN PART ON CONDITIONS WITHIN A CONDENSER OF THE VAPOR COMPRESSION SYSTEM," filed Oct. 4, 2018, which claims priority from and the benefit of U.S. Provisional Application Ser. No. 62/610,778, entitled "ACTIVATION AND DEACTIVATION OF A PURGE UNIT OF A VAPOR COMPRESSION SYSTEM BASED AT LEAST IN PART ON CONDITIONS WITHIN A CONDENSER OF THE VAPOR COMPRESSION SYSTEM," filed Dec. 27, 2017, and U.S. Provisional Application Ser. No. 62/570,449, entitled "ACTIVATION AND DEACTIVATION OF A PURGE UNIT OF A VAPOR COMPRESSION SYSTEM BASED AT LEAST IN PART ON CONDITIONS WITHIN A CONDENSER OF THE VAPOR COMPRESSION SYSTEM," filed Oct. 10, 2017, each of which is hereby incorporated by reference in its entirety for all purposes.

BACKGROUND

This application relates generally to vapor compression systems incorporated in air conditioning and refrigeration applications.

Vapor compression systems utilize a working fluid, typically referred to as a refrigerant, which changes phases between vapor, liquid, and combinations thereof, in response to being subjected to different temperatures and pressures associated with operation of the vapor compression system. For example, a heating, ventilation, air conditioning, and refrigeration (HVAC&R) system may include a chiller, which is a type of vapor compression system that cycles a refrigerant to remove heat from (e.g., to cool) a flow of water traversing tubes that extend through a chiller evaporator. The chilled water flow can be directed to nearby structures to absorb heat (e.g., provide cooling) before being cycled back to the chiller evaporator to be cooled once again.

Certain chillers utilize a low pressure refrigerant, and, as a result, a portion of the chiller may operate below atmospheric pressure. Therefore, if any defects are present in this portion of the chiller, non-condensables (e.g., air, atmospheric gases) may enter the chiller and become trapped. When present, non-condensables generally decrease chiller efficiency, since more power is consumed as the chiller attempts to maintain cooling capacity.

Certain chillers include purge units that remove non-condensables from the chiller. For example, the purge unit can include an independent (secondary) vapor compression system that is used to cool and condense refrigerant from a mixture of refrigerant vapor and non-condensables extracted from the chiller. The purge unit subsequently returns the condensed liquid refrigerant back to the chiller and vents the non-condensables, and removal of these non-condensables returns the chiller efficiency back to normal levels. However, purge units also consume power when active, which can reduce the efficiency of the chiller system.

DETAILED DESCRIPTION

As set forth above, non-condensables that leak into a vapor compression system, such as a chiller, generally reduce the efficiency of the system. While certain vapor compression systems have purge units to remove these non-condensables, purge units generally consume power and, therefore, reduce the efficiency of the system when active. With this in mind, present embodiments are directed to purge units of vapor compression systems, and methods of control thereof, that improve efficiency by selectively activating and deactivating the purge unit in response to one or more conditions to, for example, enable refrigerant-to-air ratios within the purge unit within certain industry standards while still minimizing the durations of the purge cycles. As discussed below, these conditions may include conditions within the chiller condenser, time since last purge activation, time since last venting of non-condensables, and combinations thereof. By reducing an amount of time that the purge unit would be active without removing a substantial amount non-condensables from the vapor compression system, present embodiments reduce the power consumption of the purge unit, as well as the vapor compression system as a whole, while still being responsive to prevent or mitigate a loss of efficiency due to a substantial accumulation of non-condensables in the condenser of the vapor compression system.

Figure 1:
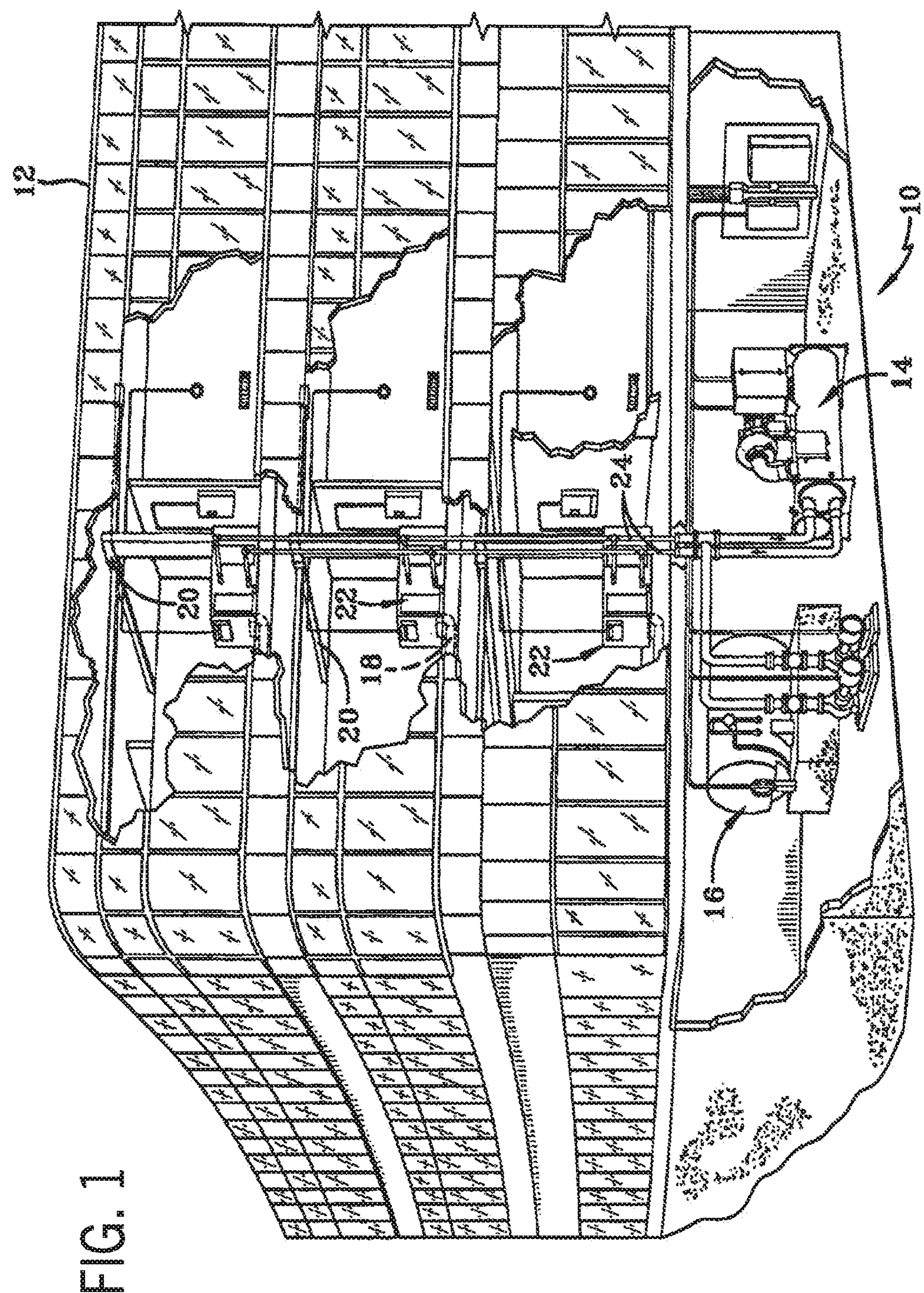
FIG. 1 is a perspective view of a building that may utilize an embodiment of a heating, ventilation, air conditioning, and refrigeration (HVAC&R) system in a commercial setting, in accordance with an embodiment of the present techniques.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
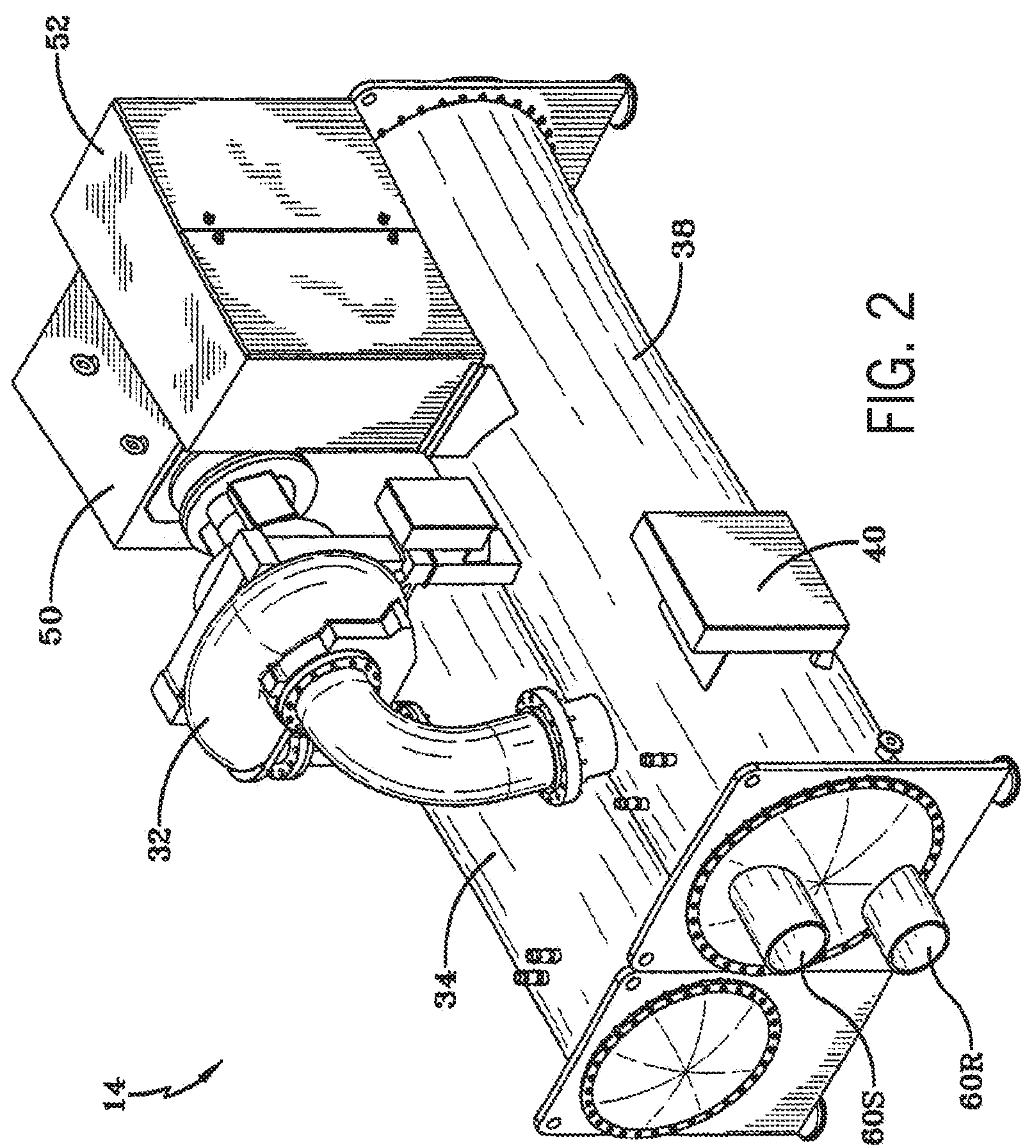
FIG. 2 is a perspective view of an embodiment of a vapor compression system, in accordance with an embodiment of the present techniques.
Figure 3:
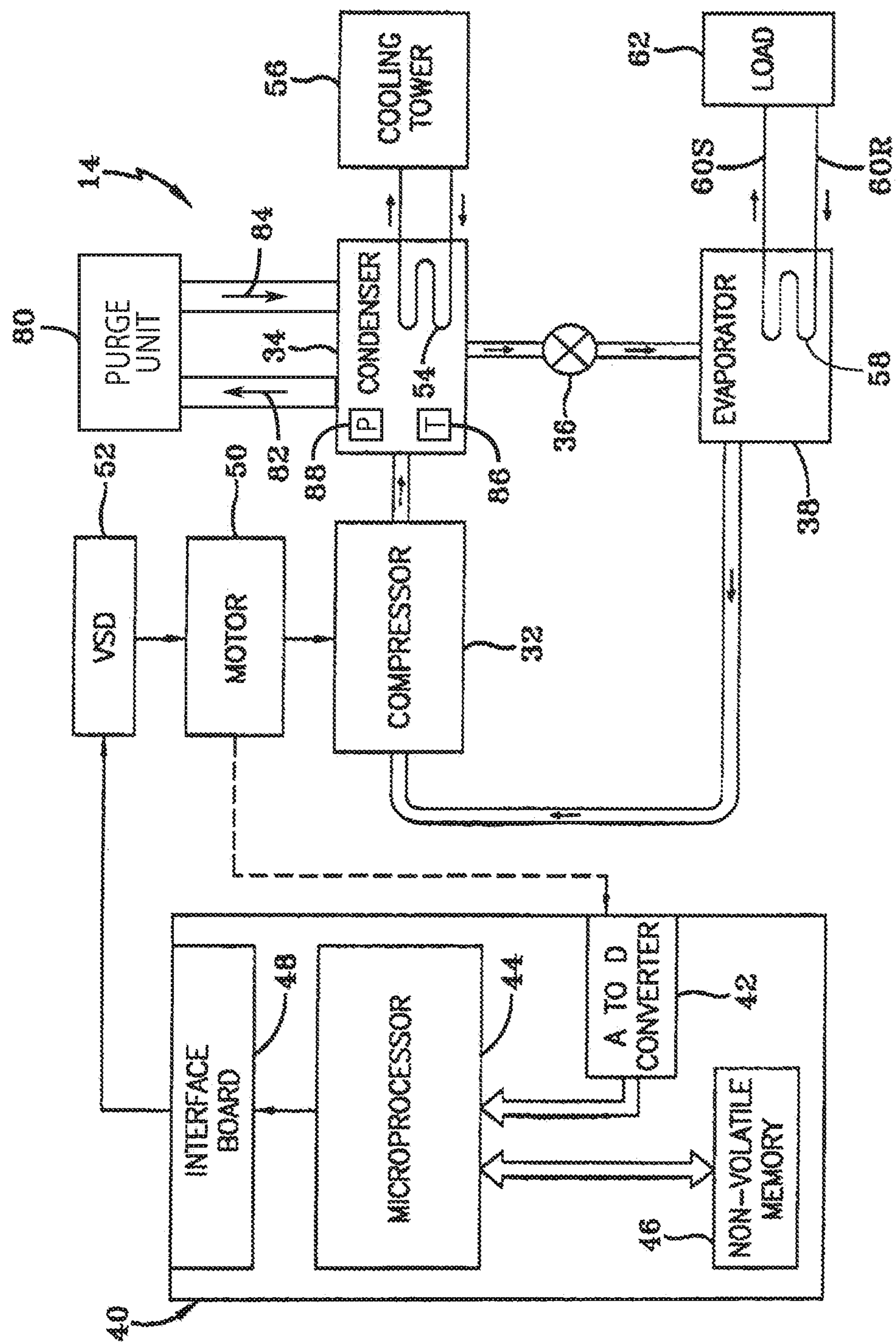
FIG. 3 is a schematic of an embodiment of the vapor compression system of FIG. 2, in accordance with an embodiment of the present techniques.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
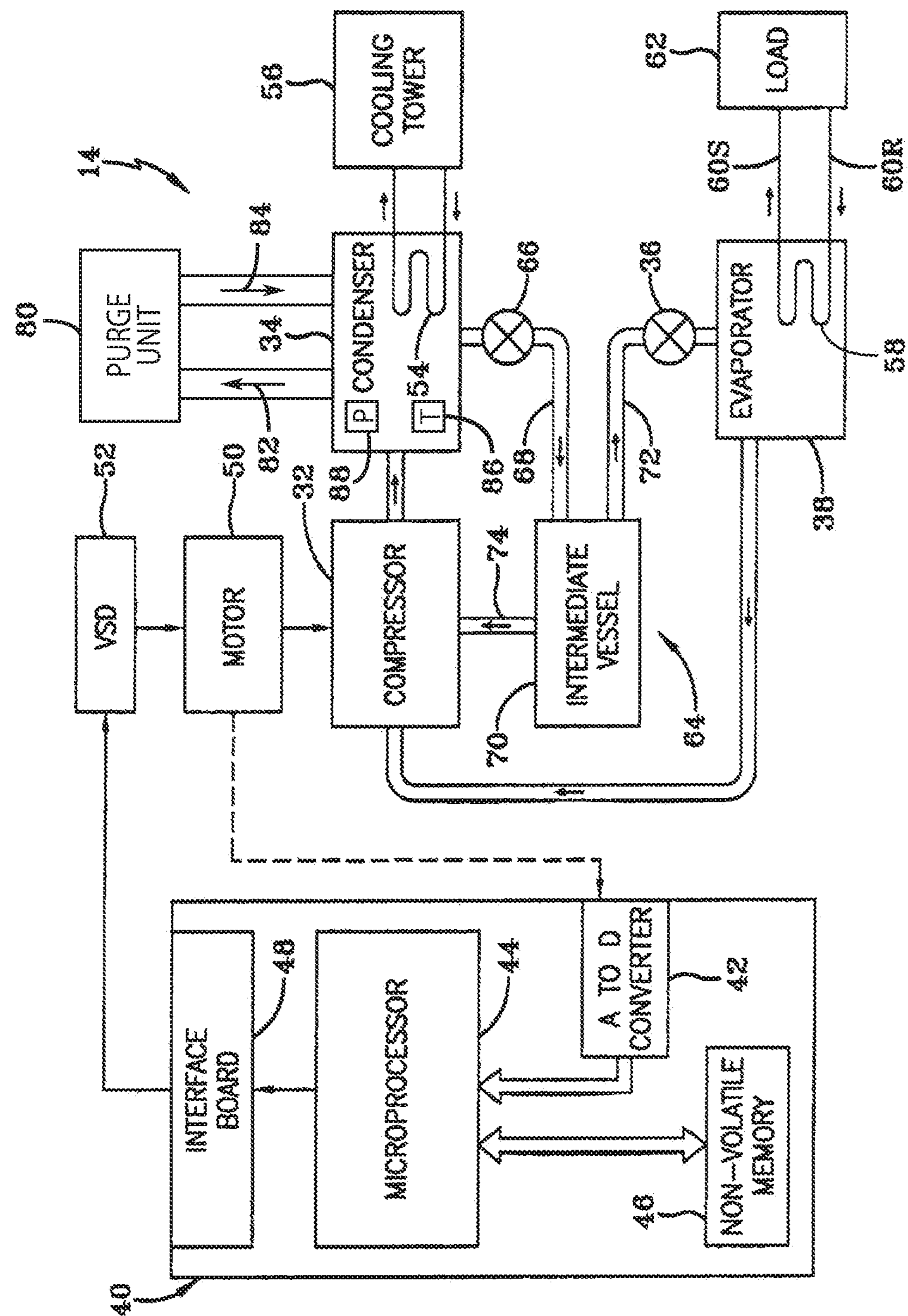
FIG. 4 is a schematic of another embodiment of the vapor compression system of FIG. 2, in accordance with an embodiment of the present techniques.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

It is presently recognized that, during operation of the vapor compression system 14, non-condensables (e.g., air, atmospheric gases) that leak into the system tend to accumulate within the condenser 34. Accordingly, as illustrated in FIGS. 3 and 4, the vapor compression system 14 includes a purge unit 80 that is fluidly coupled to the condenser 34. As illustrated, the purge unit 80 receives a purge vapor flow 82 (e.g., a mixture of refrigerant vapor and non-condensables) from the condenser 34. After condensing the refrigerant vapor of the received purge vapor flow 82 into liquid refrigerant and removing the non-condensables, the purge unit 80 returns a purge return flow 84 (e.g., condensed liquid refrigerant) to the condenser 34.

In certain embodiments, the control panel 40 is communicatively coupled to the purge unit 80 such that the microprocessor 44 of the control panel 40 provides control signals to control the operation of the purge unit 80, as discussed in greater detail below. For example, in certain embodiments, the control panel 40 may be communicatively coupled to a number of sensors (e.g., a liquid refrigerant temperature sensor 86, a total pressure sensor 88, other sensors within the purge unit 80) of the vapor compression system 14. The control panel 40 may provide suitable control signals to activate or deactivate the purge unit 80 in response to data signals received these sensors, or in response to an amount of time that has passed (e.g., since the last activation of the purge unit 80, since the last release of non-condensables by the purge unit 80), or a combination thereof.

Figure 5:
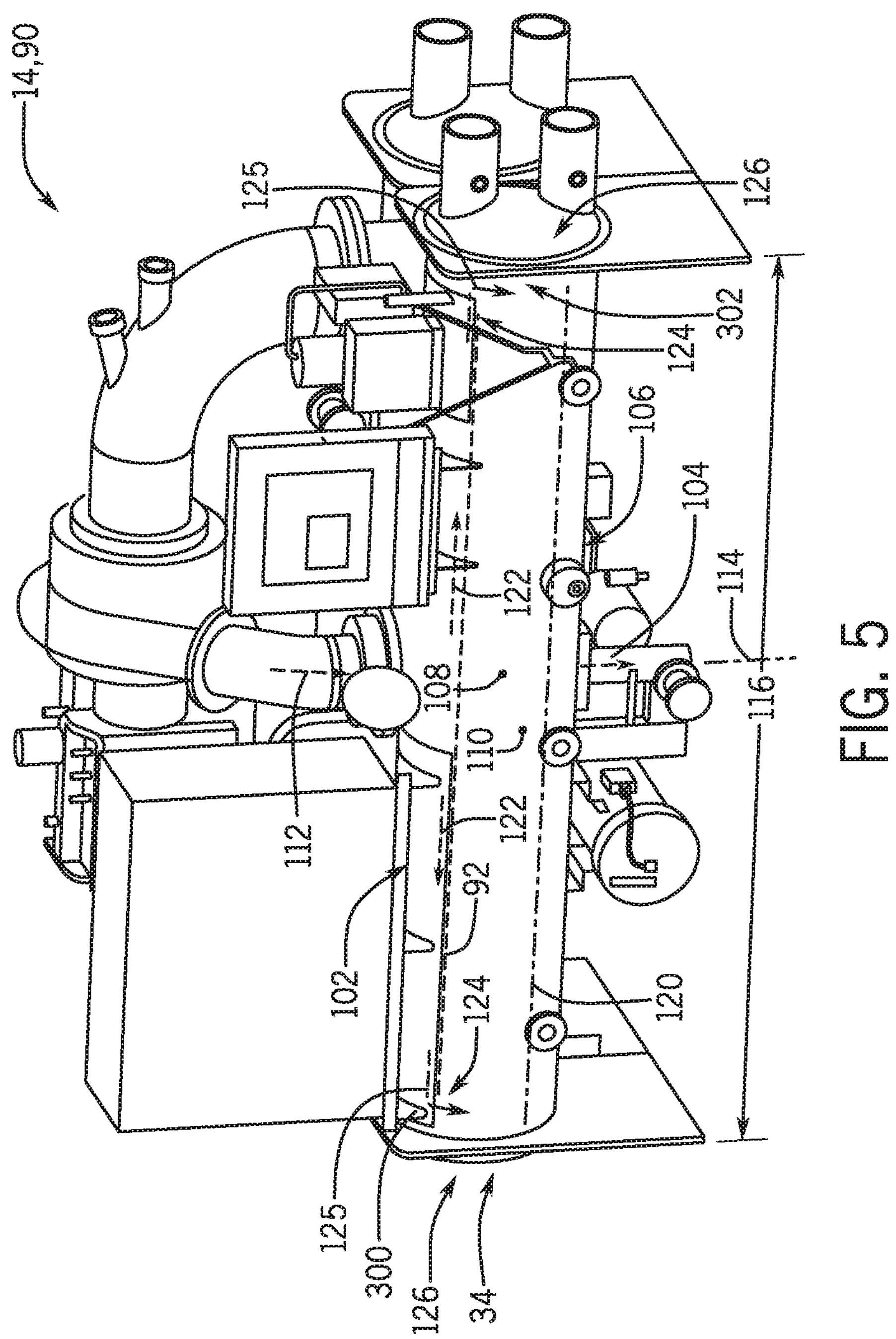
FIG. 5 is a perspective view of a condenser-side of an embodiment of the vapor compression system of FIG. 2, in accordance with an embodiment of the present techniques.
Figure 6:
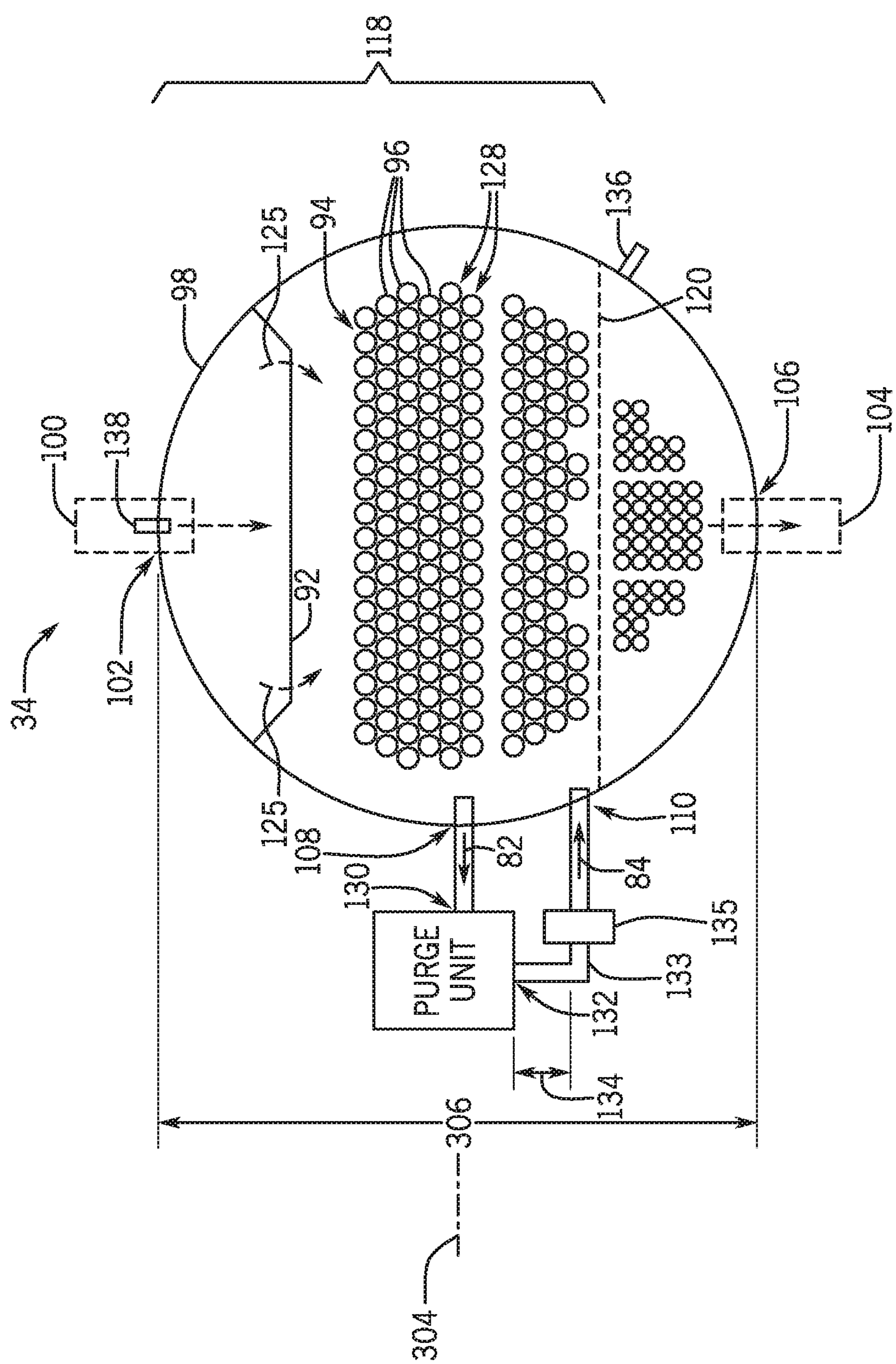
FIG. 6 is a schematic cross-sectional view of the condenser of the vapor compression system of FIG. 5, in accordance with an embodiment of the present techniques.

FIG. 5 is a perspective view of an embodiment of the vapor compression system 14, in accordance with the present techniques. More specifically, FIG. 5 illustrates a condenser-side 90 of the vapor compression system 14. Additionally, FIG. 6 is a schematic cross-sectional view of the embodiment of the condenser 34 illustrated in FIG. 5. As illustrated in these figures, the condenser 34 generally includes a discharge baffle 92 and a tube bundle 94 having a number of tubes 96 disposed within a shell 98. Additionally, the condenser 34 includes a vapor inlet 100 disposed at or near a top 102 of the condenser 34 and a liquid refrigerant outlet 104 disposed at or near the bottom 106 of the condenser. The illustrated condenser 34 also includes a purge extraction outlet 108 and a purge return inlet 110 that extend through the shell 98 and enable gas and liquid flows (e.g., purge vapor flow 82, purge return flow 84) between the interior of the condenser 34 and purge unit 80.

More specifically, during operation of the vapor compression system 14, the illustrated condenser 34 generally receives a vapor flow 112 (e.g., a flow of refrigerant vapor, possibly contaminated with one or more non-condensable gases) through the vapor inlet 100 positioned near the top 102 of the condenser 34. More specifically, as illustrated in FIGS. 5 and 6, the vapor flow 112 is received from the compressor 32, near the middle 114 or center of a length 116 (e.g., an axial length) of the condenser 34. As illustrated, the flow of refrigerant vapor 112 impinges upon a discharge baffle 92 disposed in an upper portion 118 of the condenser 34 (e.g., above a condenser liquid level 120). The discharge baffle 92 generally directs the flow axially, towards the ends 126 of the condenser, as indicated by the arrows 122. The vapor flow 112 traverses openings 124 in the discharge baffle 92 (e.g., disposed near the ends 126 of the condenser 34), as indicated by the arrows 125, and is subsequently condensed at the surface of condenser tubes 96 of the tube bundle 94. The condensed liquid refrigerant collects at a particular level (e.g., the condenser liquid level 120) before exiting the condenser 34 from the liquid refrigerant outlet 104 positioned near the bottom 106 of the condenser 34 and continuing to circulate through the vapor compression system 14 (e.g., to expansion device 36 illustrated in FIG. 3).

As illustrated in FIG. 6, the tube bundle 94 may define one or more arrangements of layers or rows of tubes 96, such as rows 128. In some embodiments, the tubes 96 of the tube bundle 94 may not include discernible rows (e.g., the tubes 96 of tube bundle 94 are arranged in a relatively random arrangement). The tubes 96 may be positioned in a fixed spacing arrangement, such that each of the tubes 96 are spaced equally apart from one another. However, in other embodiments, the tubes 96 may be positioned in a variable spacing arrangement, such that distances between tubes are different from one another. In still further embodiments, the tubes 96 may be positioned at least partially in a fixed spacing arrangement. As such, some of the tubes 96 may be spaced equally apart from one another, while other tubes 96 are spaced at different distances from one another. It may be appreciated that, in other embodiments, any other suitable arrangements of the tubes 96 may be used, in accordance with the present disclosure.

As mentioned, it is presently recognized that non-condensables generally become trapped anywhere within the upper portion 118 of the condenser 34 (e.g., above the condenser liquid level 120) during operation of the vapor compression system 14. Accordingly, in certain embodiments, the purge vapor flow 82 that is directed to a purge vapor inlet 130 of the purge unit 80 for removal of these non-condensables is extracted from a purge extraction outlet 108 of the condenser 34 disposed at any suitable position within the upper portion 118 of the condenser 34. Additionally, for the illustrated embodiment, the purge unit 80 includes a gravity-fed drain (e.g., purge return outlet 132) to return the flow of condensed liquid refrigerant 84 to the condenser 34 via the drain conduit 133. Accordingly, the illustrated condenser 34 includes the purge return inlet 110 positioned a vertical distance 134 below the purge return outlet 132 of the purge unit 80 and above the condenser liquid level 120.

Furthermore, in certain embodiments, the purge return outlet 132, the purge return inlet 110, and/or the drain conduit 133, may include at least one isolation feature 135. For example, in certain embodiments, the isolation feature 135 may be a solenoid valve, a check valve, a p-trap, or a combination thereof. For the illustrated embodiment, the isolation feature 135 operates by selectively isolating the purge unit 80 from the chiller (e.g., from condenser 34), particularly while the purge unit 80 is removing non-condensables that have been isolated from the refrigerant (e.g., while the vacuum pump 190 is active, as discussed below with respect to FIG. 8). For embodiments in which the isolation feature 135 is an actively-controlled solenoid valve, or other actively-controlled feature, the isolation feature 135 is communicatively coupled to suitable control circuitry (e.g., control panel 40) that provides signals to control the operation (e.g., opening and closing) of the isolation feature 135 to selectively allow or block fluid flow between the purge return outlet 132 and the purge return inlet 110.

It may be appreciated that, in other embodiments, the purge return outlet 132 may instead be fluidly coupled to the evaporator 36 and may instead return the flow of condensed liquid refrigerant 84 to the evaporator with no substantial performance impact on the vapor compression system 14. It may also be appreciated that, in various embodiments, the purge unit 80 may be disposed on the same side of the condenser 34 as the evaporator 38 (e.g., positioned between the condenser 34 and evaporator 38), or on an inner side of the condenser 34 (e.g., opposite the evaporator 38), or any other suitable location, in accordance with the present disclosure. Accordingly, for such embodiments, the purge extraction outlet 108 and/or the purge return inlet 110 may similarly be disposed on the same side of the condenser 34 as the evaporator 38 (e.g., positioned between the condenser 34 and evaporator 38).

The example embodiment of the condenser 34 illustrated in FIG. 6 also includes the liquid refrigerant temperature sensor 136 and the total pressure sensor 138 (e.g., pressure transducer 138). As illustrated, the liquid refrigerant temperature sensor 136 is disposed below the condenser liquid level 120 to ensure proper measurement of the temperature of the liquid refrigerant in the condenser 34. As illustrated, the total pressure sensor 138 is disposed above the condenser liquid level 120 (e.g., in the upper portion 118 of the condenser 34) to ensure proper measurement of the total pressure of refrigerant and non-condensables in the upper portion 118 of the condenser 34. In certain embodiments, the liquid refrigerant temperature sensor 136 and the total pressure sensor 138 provide data signals to the microprocessor 44 of the control panel 40, or other suitable processing circuitry, such that the microprocessor 44 of the control panel 40 can activate and deactivate the purge unit 80, at least in part, based on the measurements of the sensors 136 and 138.

Figure 7:
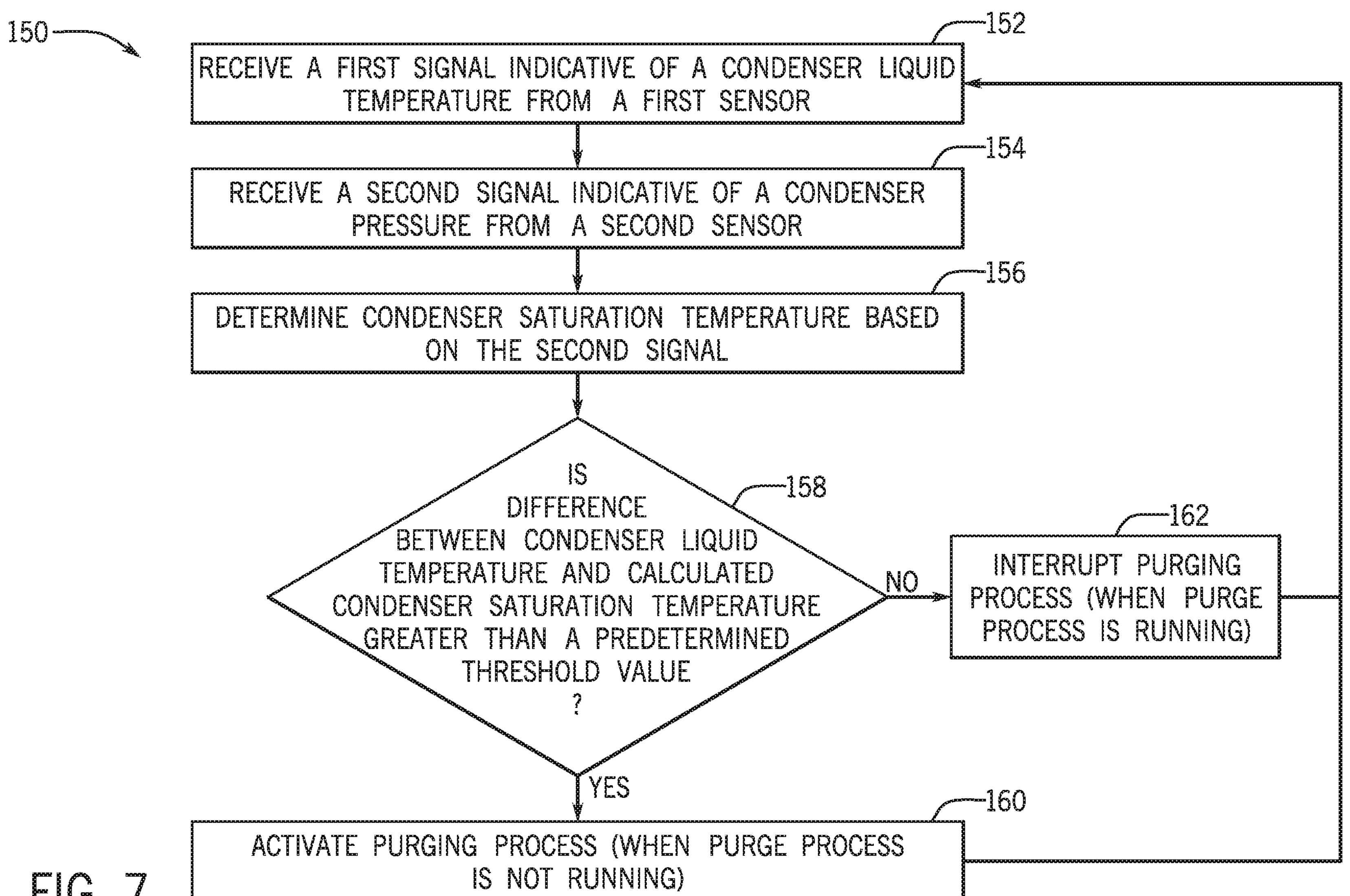
FIG. 7 is a flow diagram illustrating an embodiment of a process for activating and deactivating a purge unit of a vapor compression system in response to particular conditions within the condenser, in accordance with an embodiment of the present techniques.

By way of specific example, FIG. 7 illustrates an example embodiment of a process 150 that the microprocessor 44 of the control panel 40, or other suitable processing circuitry of the vapor compression system 14, may execute (e.g., via executable instructions stored on a memory) to determine when to selectively activate and deactivate the purge unit 80 in response to particular conditions within the condenser 34. It may be appreciated that other control strategies may additionally or alternatively be used, in accordance with the present disclosure. The process 150 illustrated in FIG. 7 begins with the microprocessor 44 receiving (block 152) data signals from the liquid refrigerant temperature sensor 136 that are indicative of a temperature of the liquid refrigerant in the condenser 34. In certain embodiments, the microprocessor 44 uses the temperature indicated by the liquid refrigerant temperature sensor 136 as a direct indication or representation of an observed condenser saturation temperature (OCST). The microprocessor 44 also receives (block 154) data signals from the total pressure sensor 138 of the condenser 34. The microprocessor 44 subsequently determines (block 158) a predicted condenser saturation temperature (PCST) for the condenser 34. For example, the microprocessor 44 may access a look-up table or use a mathematical equation stored in the non-volatile memory 46 of the control panel 40 that relates the measured total pressure to PCST in order to determine or calculate the PCST for the particular refrigerant of the vapor compression system 14.

Continuing through the process 150 illustrated in FIG. 7, the microprocessor 44 subsequently compares (block 158) the OCST and PCST determined in the blocks above. When the microprocessor 44 determines that the OCST (from block 152) is greater than the PCST (from block 156) by more than a particular threshold amount or deviation (e.g., 0.5° F., 0.75° F., 1° F.), then the microprocessor 44 activates (block 160) the purge unit 80, if or when the purge unit 80 is not already active. In certain embodiments, the microprocessor 44, or other suitable processing circuitry, may activate the purge unit 80 for a specified length of time or purge duration (e.g., 1 hour, 2 hours, 6 hours, 12 hours), until a particular condenser condition is met (e.g., until PCST is once again within the threshold of OCST), until the purge unit 80 has stopped releasing non-condensables for a predetermined amount of time, or some combination thereof. For the embodiment illustrated in FIG. 7, when the microprocessor 44 determines (block 158) that the OCST is not greater than the PCST by more than the particular amount threshold or deviation, then the microprocessor 44 interrupts (e.g., deactivates, stops) (block 162) the purge unit 80, if or when the purge unit 80 is active. In other embodiments, the microprocessor 44, or other suitable processing circuitry, may provide suitable control signals to activate and deactivate the purge unit 80 based on both a comparison of the OCST and PCST, as described, and another factor (e.g., an amount of time since the purge unit 80 has been active, an amount of time since the purge unit 80 has released non-condensables, etc.).

Figure 8:
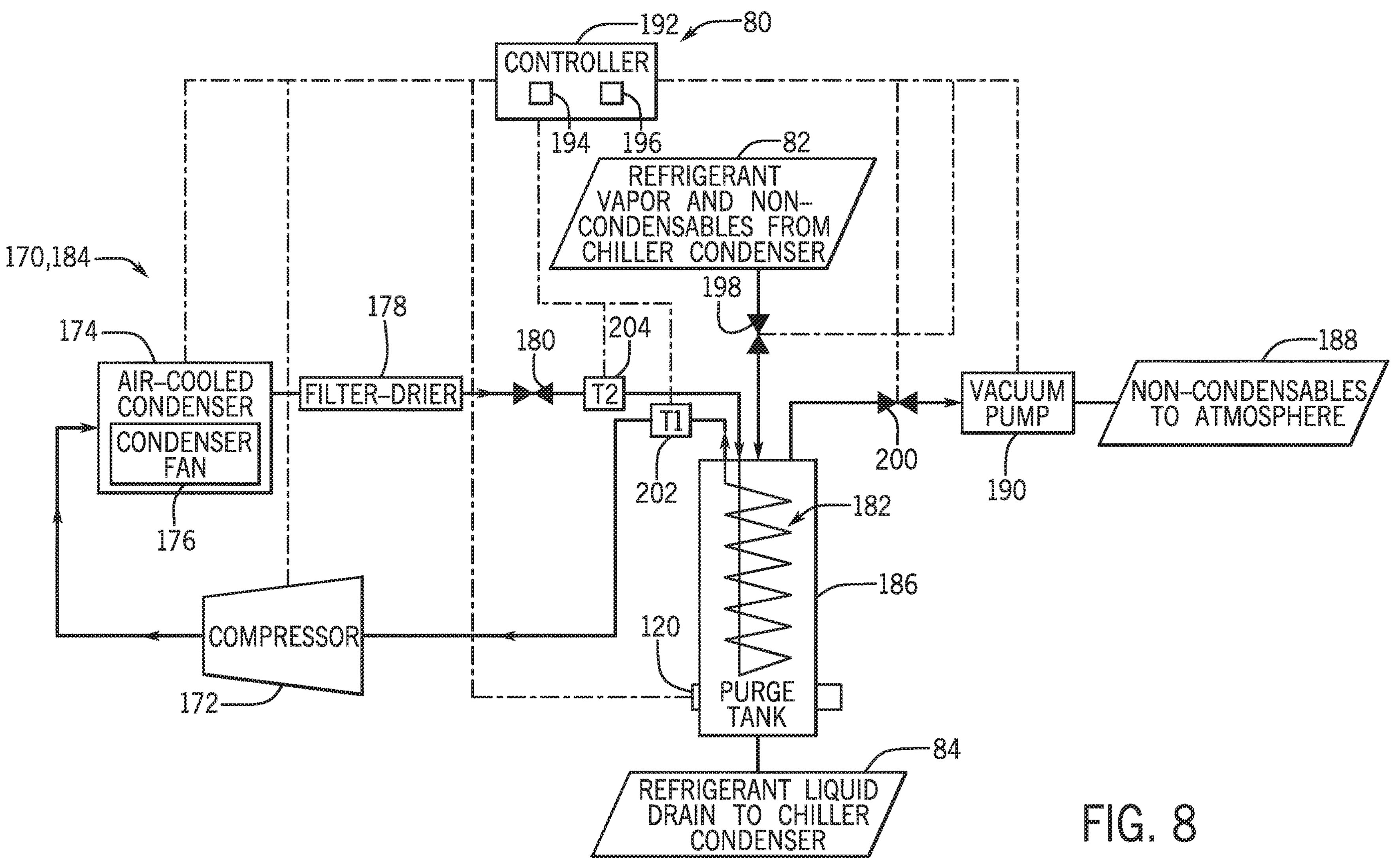
FIG. 8 is a schematic diagram of an embodiment of a purge unit, in accordance with an embodiment of the present techniques.

FIG. 8 is a schematic diagram that illustrates an embodiment of the purge unit 80, in accordance with the present techniques. The illustrated purge unit 80 comprises a vapor compression system 170 that is independent (e.g., secondary) relative to the primary vapor compression system 14 (e.g., chiller 14) that is being purged. As such, the illustrated embodiment of the purge unit 80 includes a compressor 172, condenser 174 having fan 176, filter-drier 178, expansion valve 180, and an evaporator coil 182 fluidly coupled together to form the refrigeration loop or circuit 184 of the illustrated embodiment of the vapor compression system 170.

When the purge unit 80 illustrated in FIG. 8 is active, a refrigerant (e.g., R404a, or another suitable refrigerant), after being liquefied by the combined actions of the compressor 172 and condenser 174, is introduced into the evaporator coil 182 disposed within a purge tank 186 to condense the purge vapor flow 82 that enters the purge tank 186. More specifically, for the illustrated embodiment, the purge tank 186 receives the purge vapor flow 82 (e.g., a supply of refrigerant vapor and non-condensables) from the purge extraction outlet 108 of the condenser 34 of the primary vapor compression system 14 (e.g., chiller 14). Refrigerant vapor of the purge vapor flow 82 that condenses within the purge tank 186 is returned as a purge return flow 84 e.g., the flow of liquid refrigerant) back to the purge return inlet 110 condenser 34. Non-condensable gases 188 received from the primary vapor compression system 14 in the purge vapor flow 82, which do not condense within the purge tank 186, are subsequently removed by the vacuum pump 190, as discussed in greater detail below.

The purge unit 80 illustrated in FIG. 8 includes a controller 192 that is communicatively coupled to the various components of the purge unit 80 to control operation (e.g., activation, deactivation, evacuation) of the purge unit 80. For the illustrated embodiment, the controller 192 includes a memory 194 storing instructions and a processor 196 that executes these instructions to control operation of the purge unit 80. In other embodiments, the controller 192 may be the control panel 40, and the microprocessor 44 may execute instructions stored in the non-volatile memory 46 to control operation of the purge unit 80 in addition to the primary vapor compression system 14 and/or the HVAC&R system 10, as discussed above. In certain embodiments, the controller 92 may be distinct from, and communicatively coupled to, the control panel 40 to exchange data and/or control signals. For example, in such an embodiment, the processor 196 of the controller 192 can send data signals to the microprocessor 44 of the control panel 40 to indicate whether the purge unit 80 is active and any error messages or notifications that have been generated by the purge unit 80 during operation, as discussed in greater detail below. Similarly, in such an embodiment, the microprocessor 44 of the control panel 40 can send data signals to the processor 196 of the controller 192 to indicate measured or calculated parameters of the primary vapor compression system 14 (e.g., measured condenser liquid temperature, measured condenser pressure, calculated condenser saturation temperature), such that the controller 192 can determine when to selectively activate and deactivate the purge unit 80, as discussed in detail below.

For the embodiment illustrated in FIG. 8, the controller 192 is communicatively coupled to receive data signals from and/or provide control signals to the various components of the purge unit 80. For example, the processor 196 of the controller 192 can activate the purge unit 80 by providing suitable control signals to activate the compressor 172 and the fan 176 of the condenser 174. The processor 196 of the controller 192 can provide suitable control signals to actuate a first solenoid valve 198, which remains in an open position, except during evacuation of non-condensates by the vacuum pump 190, as discussed below. Similarly, the processor 196 of the controller 192 can provide suitable control signals to actuate a second solenoid valve 200, which remains in a closed position, except during evacuation of non-condensables by the vacuum pump 190, as discussed below. The controller 192 can also provide suitable control signals to activate and deactivate the vacuum pump 190 (e.g., to operate the vacuum pump 190 for a predetermined amount of pump down time before deactivating the pump). Furthermore, the illustrated controller 192 can receive data signals from a liquid level sensor 199 indicating a level of condensed liquid refrigerant in the purge tank 186.

Additionally, for the embodiment of the purge unit 80 illustrated in FIG. 8, the processor 196 of the controller 192 is communicatively coupled to at least two temperature sensors. The first temperature sensor 202 measures a temperature (T1) of the purge unit refrigerant exiting the evaporator coil 182, while the second temperature sensor 204 measures a temperature (T2) of purge unit refrigerant entering the evaporator coil 182 of the purge unit 80. It is presently recognized that when the evaporator coil 182 is condensing refrigerant vapor from the primary vapor compression system 14, generally T1 increases (e.g., absolutely or relative to T2). However, when the purge tank 186 includes a substantial quantity of non-condensable gases, then T1 decreases (e.g., approaches T2). Therefore, as set forth below, the processor 196 of the controller 192, or other suitable processing circuitry, determines when to evacuate the purge tank 186 based on at least T1. For example, in certain embodiments, the processor 196 of the controller 192 may compare T1 to a predetermined threshold value (e.g., 15 degrees Fahrenheit (° F.)) and initiate an evacuation of the purge tank 186 when T1 is below (e.g., less than) the predetermined threshold value. In other embodiments, the processor 196 of the controller 192 may compare a difference between T1 and T2 to a predetermined threshold value (e.g., 0.5° F., 1° F., 5° F.) and initiate an evacuation of the purge tank 186 when the difference between T1 and T2 is below (e.g., less than) the predetermined threshold value.

Figure 9:
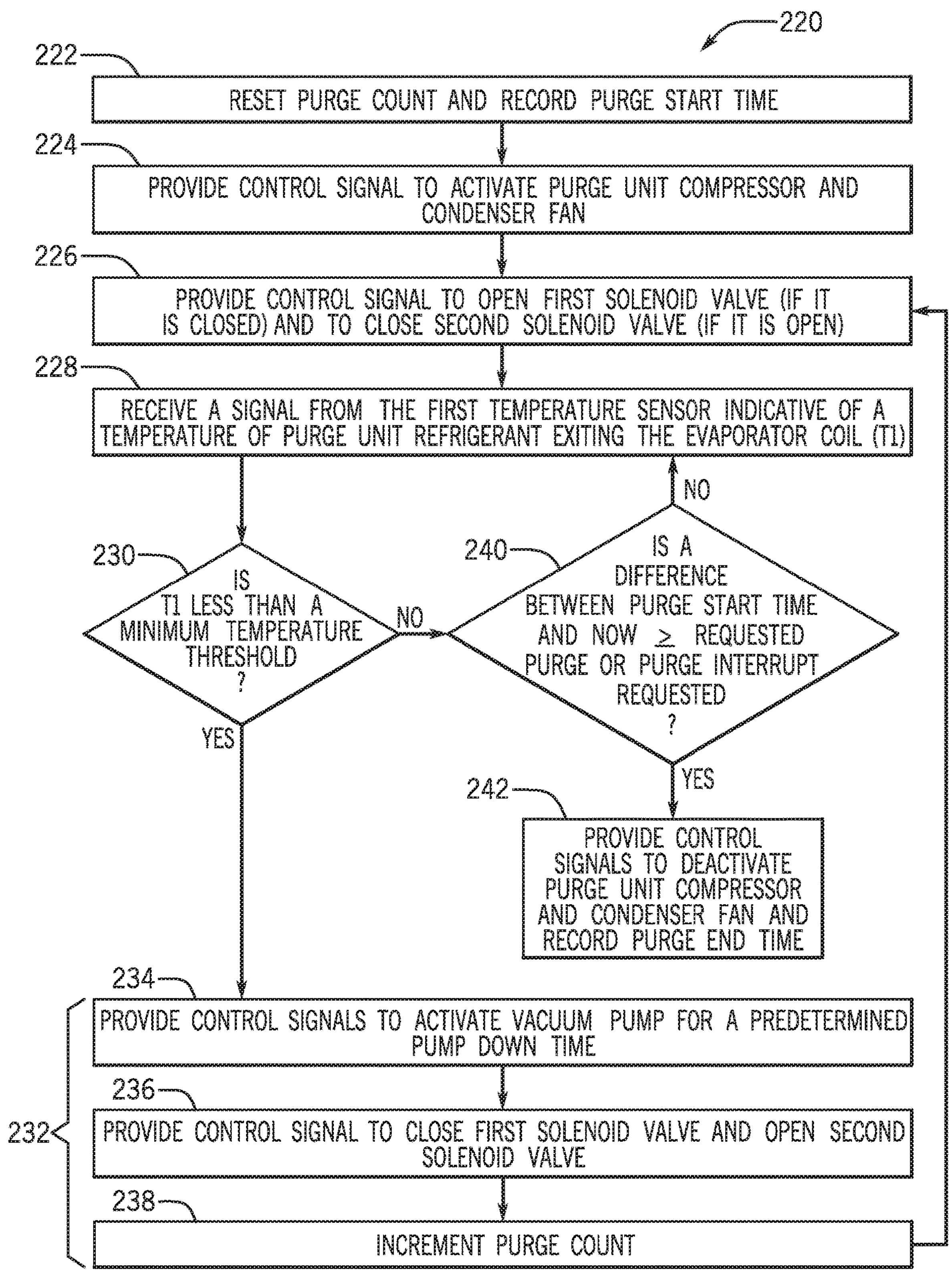
FIG. 9 is a flow diagram illustrating an embodiment of a purge process of the purge unit, in accordance with an embodiment of the present techniques.

For example, FIG. 9 is a flow diagram illustrating an example embodiment of a purge process 220 whereby the processor 196 of the controller 192 of the purge unit 80, or other suitable processing circuity of the vapor compressions system 14, operates the purge unit 80. It may be appreciated that, in other embodiments, the process 220 may include additional steps, omit illustrated steps, involve simultaneous execution of multiple steps, and/or involve the performance of steps in different order than illustrated in FIG. 9. For the illustrated example, the process 220 is executed when the microprocessor 44 of the control panel 40 or the processor 196 of the controller 192 requests or triggers activation of the purge unit 80, either for a specified amount of time, referred to herein as purge duration, or for an unlimited amount of time (e.g., until interrupted).

The illustrated purge process 220 begins with the processor 196 resetting (block 222) a counter that tracks the number of evacuations of the purge tank 186 during the current purge process, as well as recording a start time for the purge process. The processor 196 provides (block 224) suitable control signals to the compressor 172 and condenser fan 176 of the purge unit 80 to activate both devices, activating the purge unit 80. The processor 196 further provides (block 226) suitable control signals to open the first solenoid valve 198 (e.g., if it is determined to be closed) and to close the second solenoid valve 200 (e.g., if it is determined to be open).

The embodiment of the process 220 illustrated in FIG. 9 continues with the processor 196 receiving (block 228) a signal from the first temperature sensor 202 indicative of the temperature (T1) of purge unit refrigerant exiting the evaporator coil 182 of the purge unit 80. The processor 196 analyzes T1 to determine whether evacuation of the purge tank 186 should proceed. For the example embodiment, the processor 196 determines (block 230) whether T1 is less than a predetermined temperature threshold (e.g., 15° F.). In other embodiments, the processor 196 may compare a difference between T1 and T2 to a different predetermined threshold value (e.g., 5° F., 10° F., 15° F.).

When the processor 196 determines that T1 has fallen below the predetermined temperature threshold, the processor 196 provides suitable control signals to instigate or initiate evacuation of the purge tank 186, as indicated by the steps within bracket 232. For example, as illustrated, the processor 196 provides (block 234) control signals to activate the vacuum pump 190 for a predetermined amount of pump down time (e.g., 30 seconds, 45 seconds, 1 minute) and provides (block 236) control signals to close the first solenoid valve 198 and open the second solenoid valve 200. The processor 196 further increments the purge count (block 238) and resumes the process 220 at block 222.

For the illustrated example, in block 230, when T1 is above the predetermined temperature threshold, the processor 196 then determines (block 240) whether the purge duration has expired or if a purge interruption has been requested. For example, as illustrated, the processor 196 may compare a current time to the purge start time recorded in block 222 to determine whether the purge duration has expired. The processor 196 may further check to see if it has been determined that the purge unit should be interrupted due to a change in the conditions within the condenser (e.g., in accordance with blocks 158 and 160 of FIG. 7). If the purge duration has not expired and the purge process has not been interrupted, the processor 196 continues receiving (block 228) the signal indicating T1, and continues determining (block 230) whether T1 has risen above the predetermined temperature threshold, until the purge duration expires or the purge process is interrupted (block 240). Subsequently, the processor 196 provides (block 242) suitable control signals to deactivate the compressor 172 and condenser fan 176 of the purge unit 80, thereby deactivating the purge unit 80. Additionally, as illustrated, the processor 196 may record in memory 194 a purge end time and the purge count for this execution of the purge process 220.

Figure 10:
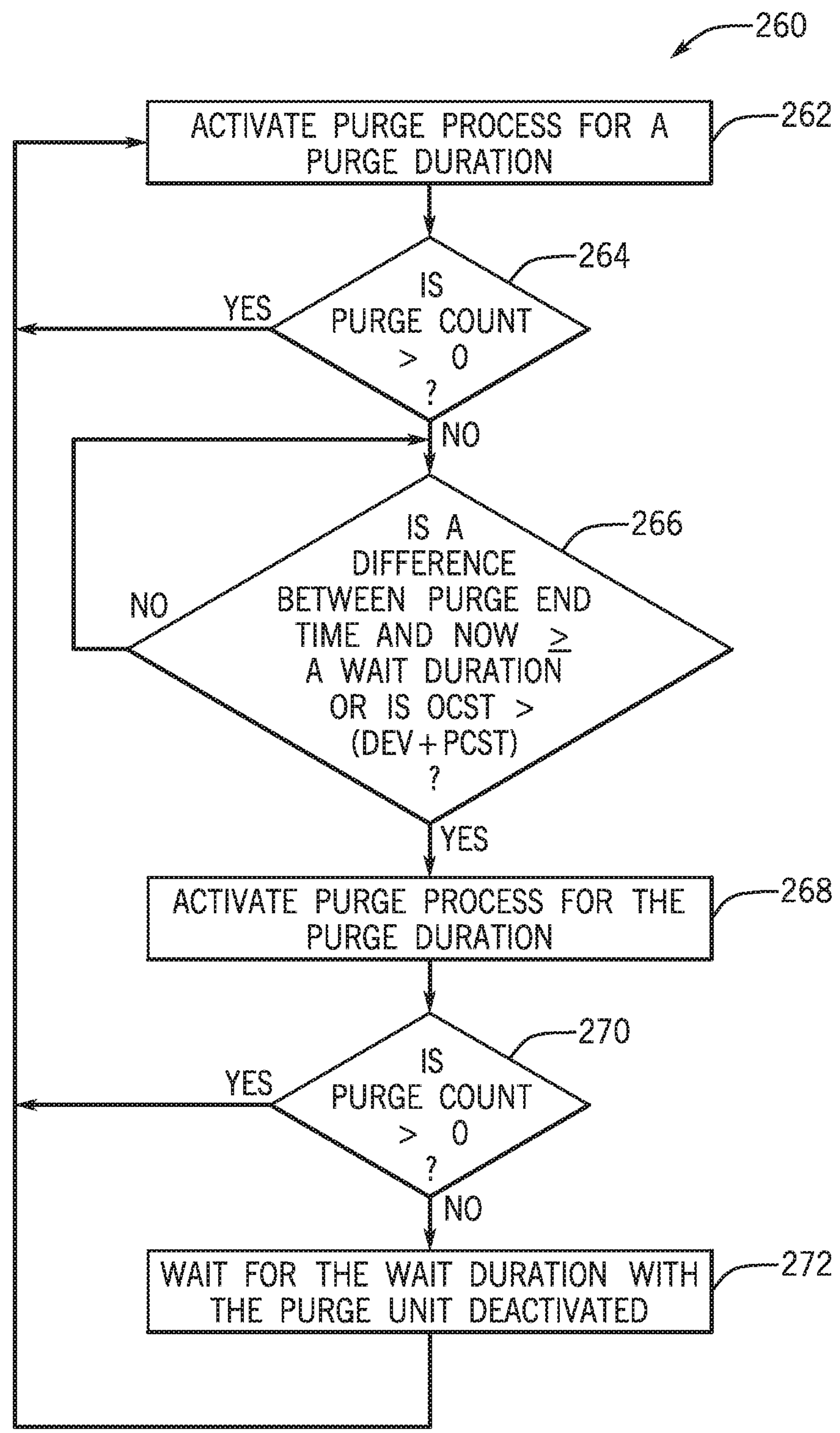
FIG. 10 is a flow diagram illustrating an embodiment of a standard purge mode of operation of the purge unit, in accordance with an embodiment of the present techniques.

In certain embodiments, the processor 196 of the controller 192 of the purge unit 80, or other suitable processing circuitry, may activate the purge unit 80 in a standard purge mode of operation. An example embodiment of a standard purge mode process 260 is illustrated in FIG. 10. In other embodiments, the indicated purge durations and wait durations may be longer or shorter, depending on the nature of the primary vapor compression system 14. It may be appreciated that, in other embodiments, the process 260 may include additional steps, omit illustrated steps, involve simultaneous execution of multiple steps, and/or involve the performance of steps in different order than illustrated in FIG. 10.

As illustrated, the process 260 begins with activating (block 262) the purge process (e.g., the purge process 220 illustrated in FIG. 9) for a predetermined purge duration (e.g., 2 hours). As set forth above, upon completion of the purge process 220, the memory 194 of the controller 192 may store the purge count and the purge end time. Accordingly, continuing through the process 260 illustrated in FIG. 10, the processor 196 subsequently considers the purge count value to determine (block 264) whether any evacuations of the purge tank 186 occurred during the activation of the purge process of block 262. If the purge count indicates that one or more evacuations did occur, the processor 196 again activates the purge process 220 for the purge duration (e.g., 2 hours) (block 262). If the purge count indicates that no evacuations have occurred (e.g., that steps of bracket 232 of the purge process 220 were not executed), then the processor 196 may proceed to the following step in the process 260.

For the illustrated embodiment, once the purge unit 80 has been activated for the purge duration (e.g., 2 hours) (block 262) without any evacuations (block 264), the processor 196 may wait at block 266 until a particular set of conditions are met to proceed. For the illustrated example embodiment, the processor 196 receives data from communicatively coupled sensors (e.g., liquid refrigerant temperature sensor 136, total pressure sensor 138 illustrated in FIG. 6) disposed in the interior of the condenser 34 of the primary vapor compression system 14, or from another communicatively coupled processor having access to this data, to determine the OCST and PCST of the condenser 34, as discussed above. Using these values, the processor 196 determines (block 266) whether the OCST is more than a threshold or deviation value (DEV) greater (e.g., more than 0.5° F. greater) than the PCST. When this condition is met, or when the purge unit 80 has been inactive for at least a predetermined wait duration (e.g., 6 hours, based on the purge stop time) (block 266), then the processor 196 proceeds to the next step of the process 260.

For the illustrated embodiment, the process 260 continues with again activating (block 268) the purge process for the purge duration (e.g., 2 hours). Subsequently, the processor 196 considers the purge count to determine (block 270) whether any evacuations occurred during the purge process initiated at block 268. As illustrated, if the processor 196 determines that any evacuations of the purge tank 186 occurred, then the processor 196 proceeds back to block 262 of the process 260. When the processor 196 determines that no evacuations have occurred (e.g., that steps of bracket 232 of the purge process 220 were not executed), then the processor 196 may wait (block 272) during the wait duration (e.g., 6 hours) with the purge unit 80 deactivated before proceeding back to block 262 of the process 260. Accordingly, the embodiment of the standard purge mode process 260 illustrated in FIG. 10 limits an amount of time that the purge unit 80 is active, reducing power consumption and improving the efficiency of the primary vapor compression system 14 and the HVAC&R system 10.

Figure 11:
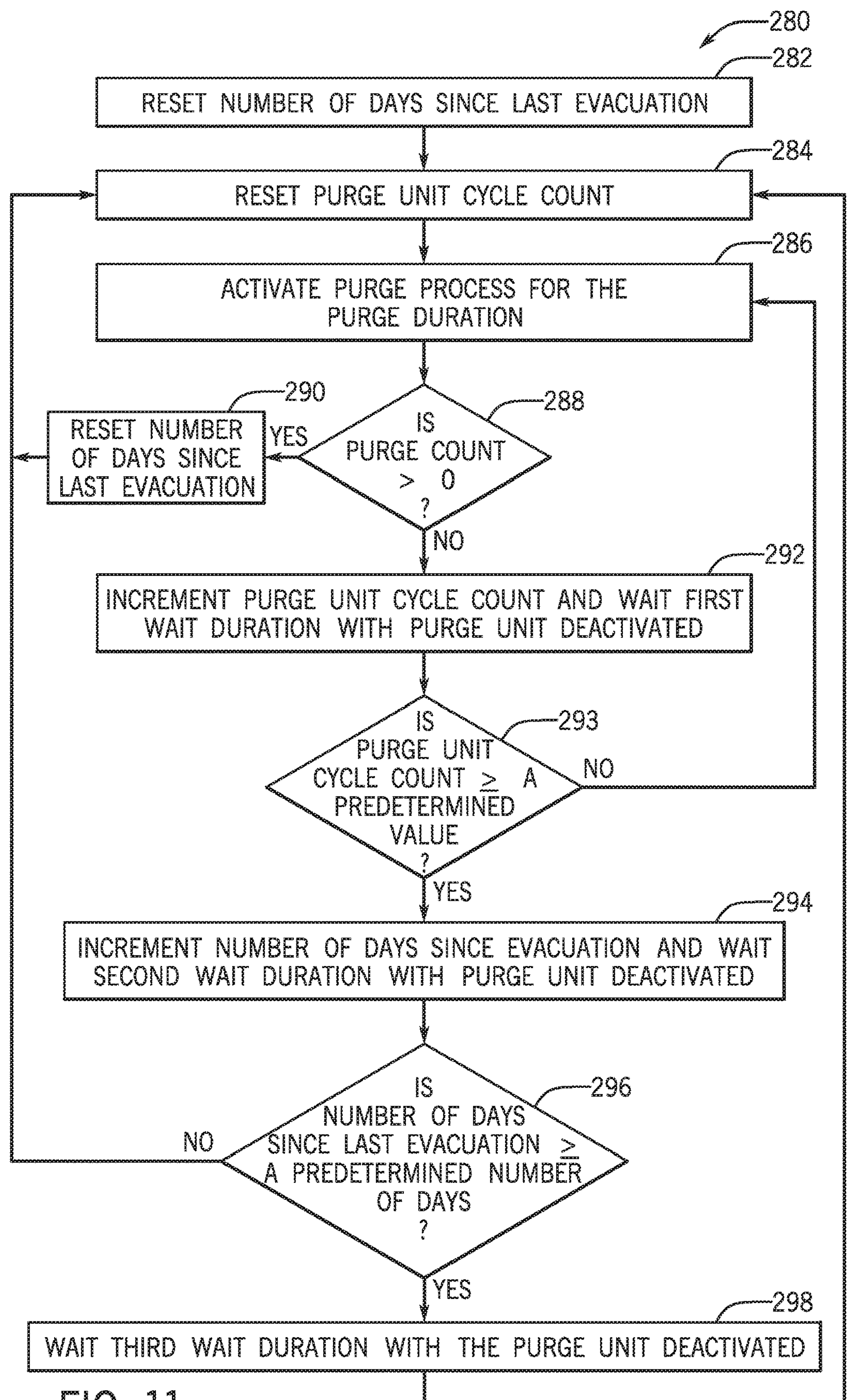
FIG. 11 is a flow diagram illustrating an embodiment of an enhanced purge mode of operation of the purge unit, in accordance with an embodiment of the present techniques.

In certain embodiments, the processor 196 of the controller 192 of the purge unit 80, or other suitable processing circuitry, may activate the purge unit 80 in an enhanced purge mode of operation. An example embodiment of an enhanced purge mode process 280 is illustrated in FIG. 11. In other embodiments, the indicated purge durations and wait durations may be longer or shorter, depending on the nature of the primary vapor compression system 14 (e.g., chiller 14). It may be appreciated that, in other embodiments, the process 280 may include additional steps, omit illustrated steps, involve simultaneous execution of multiple steps, and/or involve the performance of steps in different order than illustrated in FIG. 11.

As illustrated, the process 280 begins with resetting (block 282) a counter for a number of days since the last evacuation of the purge tank 186, and resetting (block 284) a counter for a number of purge cycles (for the day). Subsequently, the processor 196 activates (block 286) the purge process (e.g., the purge process 220 illustrated in FIG. 9) for a predetermined purge duration (e.g., 1 hour). As indicated by block 288, if the purge count indicates that at least one evacuation occurred during the purge process of block 286, then the processor 196 again resets (block 290) the counter for the number of days since the last evacuation and proceeds back to block 284.

Continuing through the illustrated embodiment, when the processor 196 determines (block 288) that no evacuations occurred during the purge process of block 286 (e.g., that steps of bracket 232 of the purge process 220 were not executed), then the processor 196 increments the purge unit cycle count and waits a first predetermined wait duration (e.g., 4 hours) with the purge unit 80 inactive (block 292). After waiting, the processor 196 determines (block 293) whether the purge unit cycle is greater than or equal to a predetermined value (e.g., 3), and if it is not, the processor 196 returns to block 286 to perform the purge process again for the purge duration (e.g., 1 hour). When the processor 196 determines (block 293) that no evacuations of the purge tank 186 have occurred, then the processor 196 increments (block 294) the number of days since the last evacuation and waits for a second wait duration (e.g., 24 hours) with the purge unit 80 deactivated, wherein the second wait duration is substantially longer than the first wait duration. For example, in one embodiment, when the processor 196 determines that no evacuations have occurred over three or more one-hour activations of the purge process, with four hours of purge unit deactivation between each, then processor 196 increments the number of days since the last evacuation and waits for 24 hours with the purge unit 80 deactivated.

Continuing through the illustrated embodiment, once the second wait duration expires, the processor 196 may determine (block 296) whether the number of days since the last evacuation is greater than or equal to a predetermined number of days (e.g., 1 week). If not, then the processor 196 proceeds back to block 284. When the processor 196 again determines (block 293) that no evacuations of the purge tank 186 have occurred during the repeated activations of the purge process, then the processor 196 again increments (block 294) the number of days since the last evacuation and waits for the second wait duration (e.g., 24 hours) with the purge unit deactivated. For example, in one embodiment, when the processor 196 determines that no evacuations have occurred during three or more one-hour purge activations with four hours of purge unit deactivation between each, then the processor 196 increments the number of days since the last evacuation and waits for 24 hours with the purge unit deactivated.

As such, for the illustrated embodiment, when the processor 196 determines (block 296) that no evacuations of the purge tank 186 have occurred over a predetermined amount of time (e.g., 1 week) of the daily purge routine (e.g., at least three one-hour activations of the purge process, four hours apart), then the processor 196 waits (block 298) a third wait duration (e.g., 7 days) with the purge unit 80 deactivated before proceeding back to block 284 of the process 280, wherein the third wait duration is substantially longer than the first and second wait durations. As illustrated, the processor 196 subsequently performs a single day of the purging routine discussed above (e.g., at least three one-hour activations of the purge process, four hours apart). If no evacuations of the purge tank 186 occur, since the number of days since the last evacuation remains greater than the predetermined number of days (e.g., 7 days), then the processor 196 again waits (block 298) the third duration (e.g., 1 week) with the purge unit 80 deactivated before proceeding back to block 284 of the process 280. Accordingly, the embodiment of the enhanced purge mode process 280 illustrated in FIG. 11 substantially limits an amount of time that the purge unit 80 is active (e.g., compared to the standard purge mode process 260 illustrated in FIG. 10). More specifically, the enhanced purge mode process 280 enables substantially better efficiency of the vapor compression system 14 by selectively deactivating the purge unit 80 when it has not been actively removing non-condensables from the primary vapor compression system 14 (e.g., when evacuations of the purge tank 186 have not been occurring). As such, the process 280 illustrated in FIG. 11 enables a further reduction in power consumption and improvement in the efficiency of the primary vapor compression system 14 and the HVAC&R system 10.

It may be appreciated that various errors or problem conditions may be encountered during the operation of the purge unit 80 and, in response, the processor 196 of the controller 192 of the purge unit 80 may provide control signals to generate warning messages to be provided to an occupant or technician. For example, during execution of the purge process 220 of FIG. 9, if the processor 196 determines that T2 has increased above a first threshold temperature (e.g., 5° F.), then the processor 196 of the purge unit 80 may send a suitable signal to provide a warning that the expansion valve 180 of the purge unit 80, as illustrated in FIG. 8, may need adjustment. If the processor 196 determines that T2 has increased above a second threshold temperature (e.g., 10° F.), then the processor 196 of the purge unit 80 may send a suitable signal to again provide the warning that the expansion valve of the purge unit 80 may need adjustment or that the second temperature sensor 204 may be defective, as well as control signals to deactivate the purge unit 80. If the processor 196 determines that the liquid level sensor 199 indicates a level of condensed liquid refrigerant in the purge tank 186 above a particular threshold, then the processor 196 may provide suitable signals to deactivate the purge unit for 1 minute and provide a warning that the purge unit 80 is temporarily deactivated while the refrigerant drains back into the condenser 34 of the primary vapor compression system 14. In certain embodiments, if the processor 196 determines that the number of evacuations (e.g., purge count) in a 24 hour period is greater than a threshold (e.g., 10, 20, 30, 40), the processor 196 provides a warning indicating that the daily purge count limit has been exceeded and that there is a possible leak in the primary vapor compression system 14. Additionally, in certain embodiments, if the processor 196 determines that the OCST remains at least the DEV value greater than the PCST for 24 consecutive hours, the processor 196 may provide a warning indicating possible air in the primary vapor compression system 14 and that maintenance of the purge unit 80 should be performed.

It may be also appreciated that, in certain embodiments, the processor 196 of the controller 192 may be programmed to switch between different operating modes. For example, in certain embodiments, the processor 196 may be able to switch between the standard purge mode process 260 and the enhance purge mode process 280, as discussed above (e.g., in response to input from a user or technician, in response to conditions within the vapor compression system 14). Additionally, in certain embodiments, the processor 196 may support other purge unit operating modes for use during installation, maintenance, and/or repair of the primary vapor compression system 14 or the HVAC&R system 10. For example, in certain embodiments, in a service mode, the processor 196 may accept input from a communicatively coupled user input device to activate the purge process 220 (e.g., as illustrated in FIG. 9) for an indicated purge duration (e.g., 12 hours, 24 hours, 72 hours, etc.). In certain embodiments, in a manual mode, the processor 196 may accept input from a communicatively coupled user input device to activate the purge process with an indefinite duration until another input (e.g., an interrupt signal) is received to deactivate the purge process. It may be appreciate that, when operating in service mode or manual mode, one or more of the errors or problem conditions (e.g., daily purge count limit) may be suppressed.

Discussed above with respect to FIGS. 3 and 4, the purge unit 80 is fluidly coupled to the condenser 34 to receive the purge vapor flow 82 (e.g., a mixture of refrigerant vapor and non-condensables) from the condenser 34, and to return condensed liquid refrigerant in the purge return flow 84 to the condenser 34, without the non-condensables. It is presently recognized that, in addition to the condenser 34 being the location that non-condensables accumulate in the primary vapor compression system 14, certain locations within the internal volume of the condenser 34 are substantially better to extract (e.g. pick up, remove) the purge vapor flow 82, in terms of efficiency of the purge unit and the purge process 220.

For example, returning to FIGS. 5 and 6, it is presently recognized that certain locations within the upper portion 118 condenser 34 are especially turbulent, resulting in a higher content of refrigerant relative to non-condensables. As such, it is presently recognized that positioning the purge extraction outlet 108 at particular locations within the upper portion 118 of the condenser 34 can enable enhanced purge efficiency compared to other positions. For example, prior to the present disclose, purge extraction outlets 108 have been located near the top 102 of the condenser 34 (e.g., near the ends 126 the condenser 34), such as in the location indicated by the arrow 300 in FIG. 5. Other purge extraction outlet locations include just above the condenser liquid level 120 near the ends of the condenser 34, as indicated by the arrow 302. However, it is presently recognized that, while these locations may include non-condensables and can be used for extraction of the purge vapor flow 82 from the condenser 34, these locations are also particularly turbulent regions within the interior of the condenser 34. As such, positioning the purge extraction outlet 108 near these locations involves the purge unit 80 operating for longer periods of time to substantially clear the vapor compression system 14 of non-condensables relative to other positions.

In contrast, as illustrated in FIGS. 5 and 6, the presently disclosed purge extraction outlet 108 is generally disposed below the discharge baffle 92 and above the condenser liquid level 120. More specifically, in certain embodiments, the purge extraction outlet 108 is located below the discharge baffle 92 and near the middle or center 114 of the length 116 of the condenser 34. As best illustrated in FIG. 6, in certain embodiments, this corresponds to positioning the purge extraction outlet 108 away from the top 102 of the condenser 34 and above the condenser liquid level 120. More specifically, the illustrated purge extraction outlet 108 may be described as being near a middle or center 304 of a height 306 (e.g., a vertical height) of the condenser 34 (e.g., near the condenser tubes 96 of the tube bundle 94). It is presently recognized positioning the purge extraction outlet 108 as presently disclosed substantially improves the efficiency of the purge unit 80, as well as the vapor compression system 14 and the HVAC&R system 10. For example, positioning of the purge extraction outlet 108 as presently disclosed can enable an approximately one hour purge activation to be as effective as an approximately 12 hours purge activation from a different purge extraction location, such as from the top 102 of the condenser 34.

In certain embodiments, during operation of the purge unit 80, the temperature and pressure in the purge tank 186 may be used to describe the ratio of refrigerant and air in the vapor portion of the purge tank 186. For example, as illustrated in FIG. 8, in certain embodiments, at least one temperature sensor 308 and at least one pressure sensor 310 may be disposed within a vapor portion 312 of the purge tank 186 (e.g., above a liquid level 314 in the purge tank 186), and measurements from the temperature and pressure sensors 308, 310 may be used by the controller 192 to determine a ratio of a mass of the refrigerant in the vapor portion 312 of the purge tank 186 to a mass of the air in the vapor portion 312 of the purge tank 186.

During the pumping out of the gas from the purge tank 186, the pumpout flow may be combined with the continued condensation on the evaporator coil 182 in the purge tank 186. In situations where the purge tank 186 includes a liquid seal in the drain, the liquid is boiled to replace the volume that was condensed and pumped out of the chiller 14. Conversely, in situations where the purge tank 186 does not include a liquid seal in the drain, flow is created from the condenser through the drain line to replace that volume. In both situations, the ratio of refrigerant in the pumpout gas increases throughout the purge cycle.

In certain embodiments, the duration of the purge cycle may be shortened to a time period where modelling and testing show that the average pumpout refrigerant-to-air ratio meet certain requirements of existing industry standards, such as ASHRAE 147/AHRI 580. For example, the controller 192 may receive the temperature and pressure measurements from the temperature and pressure sensors 308, 310, and may use these temperature and pressure measurements, in conjunction with dynamic models of the purge operations in the purge unit 80 (e.g., the purge tank 186, in certain embodiments) to determine when a refrigerant-to-air ratio in the purge unit 80 (e.g., in the purge tank 186, in certain embodiments) meets certain requirements of existing industry standards, such as ASHRAE 147/AHRI 580. For example, in certain embodiments, the controller 192 may determine a minimum duration of the purge cycle, including a minimum duration of pumpout time, for the purge unit 80 that enables that a refrigerant-to-air ratio in the purge unit 80 (e.g., in the purge tank 186, in certain embodiments) meets at least one industry standard.

Figure 12:
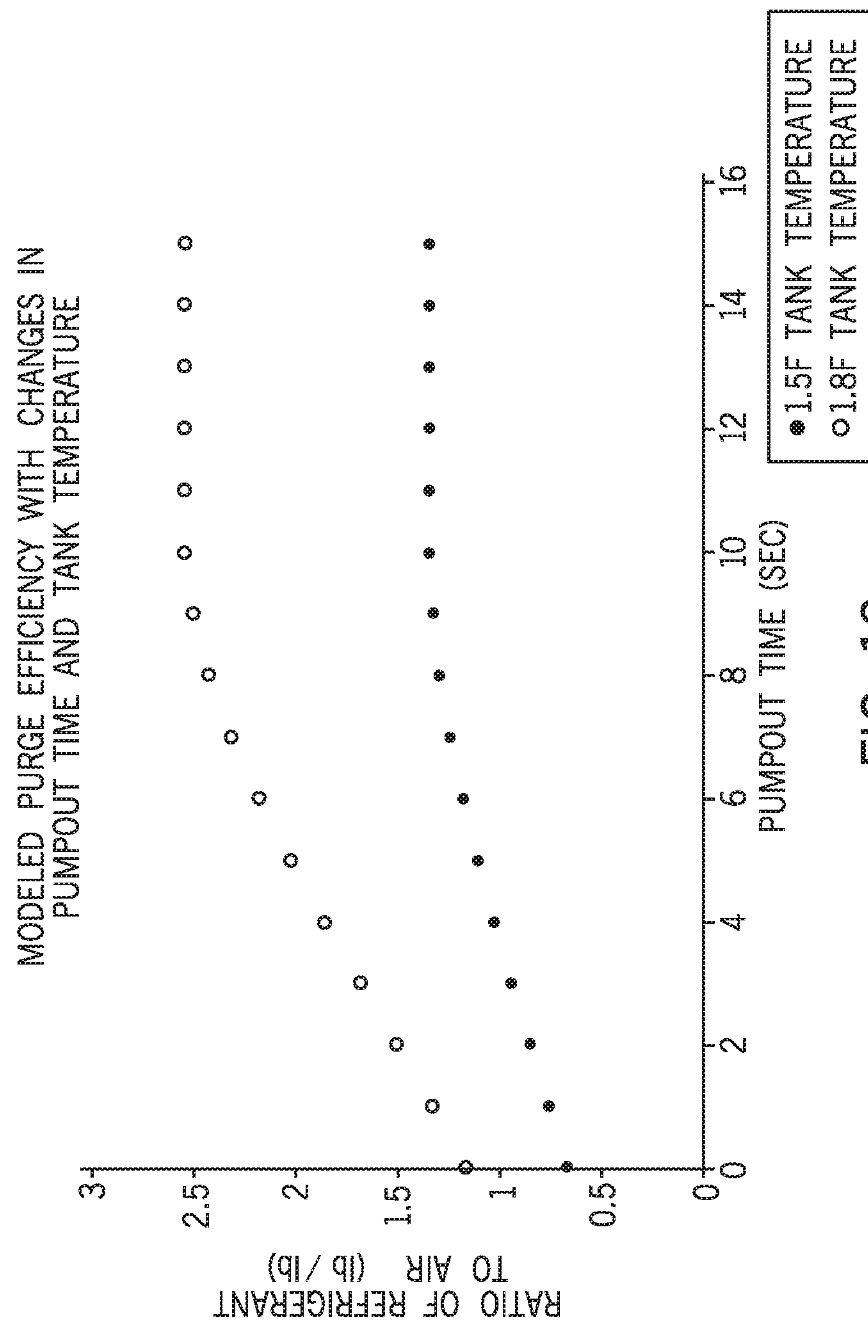
FIG. 12 is a graph of a ratio of refrigerant to air versus pumpout time within the purge unit, in accordance with an embodiment of the present techniques.

In such embodiments, for example, pumpout times for the vacuum pump 190 may be reduced from approximately 30 seconds to between approximately 5 seconds and approximately 10 seconds, between approximately 4 seconds and approximately 15 seconds, or between approximately 3 seconds and approximately 20 seconds. In addition, the temperature within the purge tank 186 may be reduced by changing the suction temperature for pumpout initiation, as well as the coil saturation temperature. In doing so, as illustrated in FIG. 12, the ratio of refrigerant to air in the purge tank 186 may be significantly reduced to, for example, less than approximately 2.5, less than approximately 2.0, less than approximately 1.5, or even lower (e.g., approximately 1.0). As used herein, the term "approximately" is intended to refer to properties that are very close to the stated value, as one skilled in the art would understand. For example, certain properties that are "approximately" equal to certain stated values may be within accepted tolerances of +/−5% from the stated value, +/−4% from the stated value, +/−3% from the stated value, +/−2% from the stated value, +/−1% from the stated value, or even smaller tolerances. As but one non-limiting example, the embodiments described herein may enable the ratio of refrigerant to air in the purge tank 186 to be significantly reduced to approximately 1.0 (e.g., between 0.95 and 1.05, assuming a tolerance of +/−5%).

In certain embodiments, the suction pressure of the compressor 172 of the secondary vapor compression system 170 may be controlled by a constant pressure expansion valve 316 to a very low saturated refrigerant pressure for the secondary refrigerant. In certain embodiments, the purge refrigerant may be low-temperature refrigerants, such as R404a or R134a, or other refrigerants capable of use in low temperatures, such as Propane, R1270, R1234yf, R1234ze, R407A, R452A, or similar.

Again, in such embodiments, the compressor 172 may be designed for relatively low temperatures, which allow a lower partial pressure of refrigerant in the purge tank 186, resulting in a lower ratio of refrigerant to air in the purge tank 186. In addition, the shorter duration of the pumpout cycle minimizes the replacement flow of refrigerant into the purge tank 186 from having much of an impact on the overall refrigerant-to-air ratio in the purge tank 186. The embodiments described herein enable existing industry standards relating to refrigerant-to-air ratios without the additional cost of certain equipment, such as emissions canisters, etc.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vapor compression system, comprising:

a refrigerant loop comprising a fluidly coupled condenser, expansion device, evaporator, and compressor, wherein the condenser comprises:

a shell;

a liquid refrigerant temperature sensor disposed within the shell;

a total pressure sensor disposed within the shell;

a purge unit fluidly coupled to the condenser, wherein the purge unit is configured to receive a purge vapor flow of refrigerant vapor and non-condensable gas in the condenser, to condense the refrigerant vapor of the purge vapor flow into a condensed liquid refrigerant, to remove the non-condensable gas from the purge vapor flow, and to return the condensed liquid refrigerant to the condenser as a purge return flow; and a processor communicatively coupled to the liquid refrigerant temperature sensor and the total pressure sensor, wherein the processor is configured to:

receive, from the liquid refrigerant temperature sensor, a first signal indicative of a liquid refrigerant temperature in the condenser;

receive, from the total pressure sensor, a second signal indicative of a total pressure of the refrigerant vapor and non-condensable gas in the condenser;

determine an observed saturation temperature and a predicted saturation temperature of the condenser, wherein the observed saturation temperature is directly related to the liquid refrigerant temperature and the predicted saturation temperature is indirectly related to the total pressure of the refrigerant vapor and the non-condensable gas; and selectively activate a purge unit when the observed saturation temperature is greater than the predicted saturation temperature by more than a threshold amount.

2. The vapor compression system of claim 1, wherein the threshold amount is approximately 0.5 degrees Fahrenheit (° F.).

3. The vapor compression system of claim 1, wherein the condenser comprises:

a plurality of tubes disposed inside the shell and configured condense a flow of refrigerant vapor into liquid refrigerant that collects at a liquid level in a lower portion of the shell, wherein the liquid refrigerant temperature sensor is disposed below the liquid level in the shell, and the total pressure sensor is disposed in an upper portion of the shell of the condenser above the liquid level.

4. The vapor compression system of claim 1, wherein the total pressure sensor is disposed near a top of the shell of the condenser.

5. The vapor compression system of claim 1, wherein the processor is configured to selectively deactivate the purge unit when the processor determines that the observed saturation temperature is not greater than the predicted saturation temperature by more than a threshold amount.

6. The vapor compression system of claim 5, wherein, to selectively deactivate the purge unit, the processor is configured to provide control signals to deactivate a compressor and a condenser fan of the purge unit.

7. The vapor compression system of claim 1, wherein the processor is configured to activate an alarm to indicate an issue with the purge unit when the observed saturation temperature is greater than the predicted saturation temperature by more than the threshold amount for greater than a predetermined amount of time.

8. The vapor compression system of claim 1, wherein the processor is configured to determine the predicted saturation temperature of the condenser from a look-up table stored in a memory of the vapor compression system based at least in part on the total pressure of refrigerant vapor and non-condensable gas in the condenser.

9. The vapor compression system of claim 1, wherein the processor is configured to determine the predicted saturation temperature of the condenser by calculating the predicated saturation temperature based at least in part on the total pressure of refrigerant vapor and non-condensable gas in the condenser.

10. The vapor compression system of claim 1, wherein, to selectively activate the purge unit, the processor is configured to:

activate a compressor and a condenser fan of the purge unit;

receive a temperature of refrigerant exiting an evaporator coil of the purge unit; and in response to determining that the temperature of refrigerant exiting the evaporator coil of the purge unit is less than a minimum temperature threshold:

close a first solenoid valve of the purge unit disposed between the condenser and the purge unit;

open a second solenoid valve of the purge unit disposed between a purge tank of the purge unit and a vacuum pump of the purge unit; and activate the vacuum pump for a predetermined pump down time.

11. A vapor compression system comprising a purge unit fluidly coupled to a condenser of the vapor compression system, wherein the vapor compression system comprises a memory storing instructions and a processor configured to execute the instructions to control the purge unit, wherein the instructions comprise:

instructions to receive, from a liquid refrigerant temperature sensor disposed below a liquid level in a condenser of the vapor compression system, a first signal indicative of a liquid refrigerant temperature in the condenser;

instructions to receive, from a total pressure sensor disposed in an upper portion of the condenser, a second signal indicative of a total pressure of refrigerant vapor and non-condensable gas in the condenser;

instructions to determine an observed saturation temperature and a predicted saturation temperature of the condenser, wherein the observed saturation temperature is directly related to the liquid refrigerant temperature and the predicted saturation temperature is indirectly related to the total pressure of the refrigerant vapor and the non-condensable gas; and instructions to selectively activate the purge unit when the observed saturation temperature is greater than the predicted saturation temperature by more than a threshold amount.

12. The vapor compression system of claim 11, wherein the instructions comprise instructions to activate an alarm to indicate an issue with the purge unit when the observed saturation temperature is greater than the predicted saturation temperature by more than the threshold amount for greater than a predetermined amount of time.

13. The vapor compression system of claim 11, wherein the threshold amount is approximately 0.5° F.

14. The vapor compression system of claim 11, wherein the instructions comprise instructions to selectively deactivate the purge unit when the observed saturation temperature is not greater than the predicted saturation temperature by more than a threshold amount.

15. The vapor compression system of claim 11, wherein the instructions comprise instructions to determine the predicted saturation temperature of the condenser from a look-up table stored in the memory based at least in part on the total pressure of refrigerant vapor and non-condensable gas in the condenser.

16. The vapor compression system of claim 11, wherein the instructions comprise instructions to determine the predicted saturation temperature of the condenser by calculating the predicated saturation temperature based at least in part on the total pressure of refrigerant vapor and non-condensable gas in the condenser.

17. The vapor compression system of claim 11, wherein the instructions to selectively activate the purge unit comprise:

instructions to activate a compressor and a condenser fan of the purge unit;

instructions to receive a temperature of refrigerant exiting an evaporator coil of the purge unit; and instructions to, in response to determining that the temperature of refrigerant exiting the evaporator coil of the purge unit is less than a minimum temperature threshold:

close a first solenoid valve of the purge unit disposed between the condenser and the purge unit;

open a second solenoid valve of the purge unit disposed between a purge tank of the purge unit and a vacuum pump of the purge unit; and activate the vacuum pump for a predetermined pump down time.

18. The vapor compression system of claim 17, wherein the instructions comprise instructions to, in response to determining that the temperature of refrigerant exiting the evaporator coil of the purge unit is less than the minimum temperature threshold, close a third solenoid valve associated with a drain conduit of the purge unit before activating the vacuum pump.

19. A method of operating a purge unit fluidly coupled to a condenser of a vapor compression system, comprising:

receiving, via a processor of the vapor compression system, a first signal indicative of a liquid refrigerant temperature in the condenser from a liquid refrigerant temperature sensor disposed below a liquid level in a condenser of the vapor compression system;

receiving, via the processor, a second signal indicative of a total pressure of refrigerant vapor and non-condensable gas in the condenser from a total pressure sensor disposed in an upper portion of the condenser;

determining, via the processor, an observed saturation temperature of the condenser based on the first signal and determining a predicted saturation temperature of the condenser based on the second signal, wherein the observed saturation temperature is directly related to the liquid refrigerant temperature and the predicted saturation temperature is indirectly related to the total pressure of the refrigerant vapor and the non-condensable gas; and selectively activating, via the processor, the purge unit in response to the processor determining that the observed saturation temperature is greater than the predicted saturation temperature by more than a threshold amount.

20. The vapor compression system of claim 1, wherein the liquid refrigerant temperature is a direct indication or representation of the observed saturation temperature and the predicted saturation temperature is determined by the processor by accessing a look-up table or using a mathematical equation to determine or calculate the predicted saturation temperature based on the total pressure of the refrigerant vapor and the non-condensable gas.

* * * * *